United States Patent [19]

Reimann et al.

[11] Patent Number: 5,254,652

[45] Date of Patent: Oct. 19, 1993

[54] TERPOLYMERS OF ETHYLENE, THEIR PREPARATION, AND THEIR USE AS ADDITIVES FOR MINERAL OIL DISTILLATES

[75] Inventors: Werner Reimann, Duisburg; Michael Feustel, Kelkheim; John Hobes, Dinslaken, all of Fed. Rep. of Germany

[73] Assignee: Hoechst Aktiengesellschaft, Fed. Rep. of Germany

[21] Appl. No.: 813,887

[22] Filed: Dec. 23, 1991

[30] Foreign Application Priority Data

Dec. 29, 1990 [DE] Fed. Rep. of Germany ....... 4042206

[51] Int. Cl.$^5$ .................. C08F 218/04; C08F 218/08; C08F 210/02
[52] U.S. Cl. ...................................... 526/331; 526/348
[58] Field of Search ........................................... 526/331

[56] References Cited

U.S. PATENT DOCUMENTS

| | | | |
|---|---|---|---|
| 3,562,229 | 2/1971 | Bauer et al. | 526/93 |
| 3,640,834 | 2/1972 | Oberst et al. | 526/331 |

FOREIGN PATENT DOCUMENTS

| | | |
|---|---|---|
| 54138 | 6/1982 | European Pat. Off. . |
| 0217602 | 4/1987 | . |
| 217602 | 4/1987 | European Pat. Off. . |
| 271738 | 6/1988 | European Pat. Off. . |
| 0295727 | 12/1988 | European Pat. Off. . |
| 295727 | 12/1988 | European Pat. Off. . |
| 2047355 | 5/1971 | Fed. Rep. of Germany . |

*Primary Examiner*—Joseph L. Schofer
*Assistant Examiner*—Wu C. Cheng
*Attorney, Agent, or Firm*—Jordan B. Bierman

[57] ABSTRACT

Terpolymers which are copolymers of ethylene, vinyl acetate, and vinyl neononanoate or vinyl neodecanoate, a process for their preparation, and a method of their use as additives for mineral oil distillates.

4 Claims, No Drawings

TERPOLYMERS OF ETHYLENE, THEIR PREPARATION, AND THEIR USE AS ADDITIVES FOR MINERAL OIL DISTILLATES

This Application claims the benefit of German Application P 40 42 206.2, filed Dec. 29, 1990.

The present invention relates to terpolymers of ethylene, vinyl acetate, and vinyl neononanoate or vinyl neodecanoate having an average molecular mass $\overline{M}_n$ of 500 to 5,000 g/mol. They are successfully employed for improving the flow properties of mineral oils and mineral oil distillates.

BACKGROUND OF THE INVENTION

Crude oils, and middle distillates obtained by distillation of crude oils, such as gas oil, diesel oil, or heating oil, contain various amounts of dissolved long-chain paraffins (waxes), depending on their origin. At low temperatures, these paraffins precipitate as platelet-shaped crystals, sometimes with the inclusion of oil. This considerably impairs the flow properties of the crude oils and the distillates obtained from them. Deposits of solids occur, which often lead to problems in the production, transportation, and use of the mineral oil products. In the cold season, for example, blockages occur in the filters of diesel engines and furnaces, which prevent reliable metering of the fuels and ultimately can even result in an interruption of the supply of fuel or heating medium. Transportation of the middle distillates through pipelines over relatively large distances can also be impaired in winter by the precipitation of paraffin crystals.

It is known that the undesirable crystal growth can be suppressed by suitable additives, so that the tendency of the viscosity of the oils to increase is minimized. Such additives, which are known pour-point depressants or agents which improve flow, change the size and shape of the wax crystals and, in this way, counteract increases in the viscosity of the oils.

The flow and low-temperature properties of mineral oils and mineral oil distillates are described by the pour point (determined in accordance with DIN 51597) and the cold filter plugging point (CFPP; determined in accordance with DIN 51428). Both parameters are measured in °C.

Typical agents for improving the flow of crude oil and middle distillates are copolymers of ethylene with carboxylic acid esters of vinyl alcohol. Thus, according to DE 11 47 799 B1, oil-soluble copolymers of ethylene and vinyl acetate, having molecular masses between about 1,000 and about 3,000 g/mol, are added to petroleum distillate propellants or fuels having a boiling range between about 120° C. and 400° C. Copolymers which contain about 60% to 99% by weight of ethylene and about 1% to 40% by weight of vinyl acetate are preferred. They are particularly effective if they have been prepared by free radical polymerization in an inert solvent at temperatures of about 70° C. to about 130° C. under pressures of 35 to 2,100 atmospheres gauge (DE 19 14 756 B2).

Other polymers employed as agents which improve flow contain, for example, 1-hexene (cf. EP 184,083 B1) or diisobutylene (cf. EP 203,554 B1), in addition to ethylene and vinyl acetate. Copolymers of ethylene, alkenecarboxylic acid esters, vinyl esters and/or vinyl ketones are also used as pour-point depressants and for improving the flow properties of crude oils and middle distillates thereof (cf. EP 111,883 B1).

The effectiveness of the known additives for improving the properties of mineral oil fractions depends *inter alia*, on the origin of the mineral oil from which they have been obtained and, in particular, on the composition thereof. Additives which are outstandingly suitable for establishing certain values of the properties of fractions of one crude oil can therefore lead to completely unsatisfactory results on distillates of crude oils of different origins.

Additives which have a wide range of application, i.e. which effectively suppress precipitation of paraffins from mineral oils and mineral oil fractions of differing origin, have since become available. Nevertheless, there are cases in which they prove to be of little or even no value, either because they contribute little toward increasing the flow properties at low temperatures, they impair the filterability of mineral oil distillates above the cloud point, and/or they can be handled only unsatisfactorily. The reasons for this are diverse; the opening up of new raw materials and the changed processing of primary products may be mentioned as examples.

There is, therefore, a need for novel additives for improving the flow properties of those petroleums or petroleum fractions on which the additives of the prior art have little or even no effect. The additives furthermore guarantee adequate filterability of petroleum distillates above the cloud point and be usable without problems.

SUMMARY OF THE INVENTION

The invention relates to terpolymers which, in addition to ethylene units, contain 5% to 35% by weight of vinyl acetate units, and 1% to 25% by weight of vinyl neononanoate or vinyl neodecanoate units and have a number average molecular mass ($\overline{M}_n$) of 500 to 5,000 g/mol. The invention further relates to the use of the terpolymers described above for improving the flow properties of mineral oils and, in particular, mineral oil distillates.

Surprisingly, the terpolymers of the invention have proven to be outstandingly suitable for improving the flow properties also of those mineral oils and mineral oil distillates of which it has not been possible to influence the flow properties with the additives of the prior art.

The terpolymers according to the invention can, in principle, be employed as agents for improving flow both in crude oils and in the products of further processing obtained from the crude oil by distillation. However, their use in mineral oil distillates, in particular mineral oil middle distillates, is preferred. These are understood to mean hydrocarbon fractions which boil between 150° C. and 400° C. Examples of such crude oil distillates are petroleum, light heating oils, and diesel fuel. Middle distillates such as heating oil EL and diesel fuel are if particular importance.

In addition to the composition, the number average molecular mass ($\overline{M}_n$) is an essential criterion of the novel terpolymers. It is measured in a vapor phase osmometer using toluene as the solvent, and is 500 to 5,000 g/mol. Terpolymers having average molecular masses of 1,000 to 3,000 g/mol are preferably employed as agents for improving flow. The melt viscosity, measured at 140° C., of the terpolymers according to the invention is 20 to 1,000 Mpa.s, and terpolymers having a melt viscosity (at 140° C.) of 40 to 300 mPa.s are particularly suitable.

DETAILED DESCRIPTION OF THE INVENTION

Mixtures of the monomers are used as the starting substances for the preparation of the inventive terpolymers comprising ethylene, vinyl acetate, and vinyl neononanoate or vinyl neodecanoate. The vinyl esters of neononanoic acid and neodecanoic acid are commercial products which are obtained, for example, by reaction of the acids on which they are based with acetylene. Neononanoic and neodecanoic acids are commercial products, and are to be found on the market under the names Versatic acid 9 and Versatic acid 10. They are tertiary carboxylic acids which are prepared by Koch synthesis, i.e. reaction of olefins with carbon monoxide and water.

The starting substances are polymerized by known processes in the presence of initiators, such as oxygen, peroxides, hydroperoxides, or azo compounds (in this context cf., for example,[Ullmann's Encyclopadie der Technischen Chemie [Ullmann's Encyclopedia of Industrial Chemistry], 4th Edition, Volume 19, pages 169 to 178). The reaction of the monomers is carried out under pressures between 50 and 700 Mpa at temperatures between 100° C. and 350° C. Pressures of 150 to 300 Mpa and temperatures of between 120° C. and 325° C. are preferred. The number average molecular mass $\overline{M}_n$ of the terpolymers is established by varying the reaction parameters of pressure and temperature for a given composition of the monomer mixture and, if appropriate, by addition of a molecular mass regulator. Molecular mass regulators which have proven suitable are, for example, saturated or unsaturated hydrocarbons, aldehydes, or ketones. They are used in an amount of 0.05 to 10% by weight, based on the monomer mixtures. Propionaldehyde is a particularly suitable molecular mass regulator. In order to obtain polymers of the composition claimed, monomer mixtures which, in addition to ethylene and, if appropriate, a molecular mass regulator, contain 5% to 40% by weight of vinyl acetate and 1% to 30% by weight of vinyl neononanoate or vinyl neodecanoate are employed. The different rate of polymerization of the monomers is taken into account by the higher vinyl ester content (both of the neo-acids and of acetic acid) in the monomer mixture compared with the terpolymer. The polymers are obtained as colorless melts which solidify to waxy solids at room temperature.

The polymerization is carried out in known high-pressure reactors, for example autoclaves or tube reactors. The reaction mixture can contain solvents, such as aliphatic hydrocarbons, hydrocarbon mixtures, benzene, or toluene, although the solvent-free procedure has proven to be particularly suitable. The polymerization is preferably carried out in tube reactors.

The terpolymers according to the invention are added to mineral oil distillates in the form of solutions. Suitable solvents are aliphatic or aromatic hydrocarbons or hydrocarbon mixtures, for example benzine fractions and, in particular, kerosene. The mineral oil distillates improved in their rheological properties by the novel polymeric compounds contain 0.001% to 2%, preferably 0.005% to 0.5%, by weight of terpolymer, based on the distillate. The terpolymer can be used by itself or together with other additives; for example, with dewaxing auxiliaries, corrosion inhibitors, antioxidants, or sludge inhibitors. It is also possible to employ mixtures of the terpolymers according to the invention, the components of which differ in respect of their composition and/or their average molecular mass.

The preparation of the novel terpolymers and their properties are described in Examples 1 to 18, the details being summarized in Table 1. Examples 1 to 16 relate to polymers which contain vinyl neononanoate, and Examples 17 and 18 relate to those which contain vinyl neodecanoate. The use of the novel terpolymers as additives for mineral oil distillates is shown in Table 2. Table 3 contains the results of the filtration test, and Table 4 contains the pour points of terpolymers according to the invention as a measure of their handling.

The examples merely illustrate the invention, but do not limit it to the specific embodiments reproduced here.

Preparation of ethylene/vinyl acetate/vinyl neononanoate or vinyl neodecanoate terpolymers Ethylene, vinyl acetate, and vinyl neononanoate or vinyl neodecanoate are polymerized in an autoclave with the addition of propionaldehyde as a molecular mass regulator (moderator). The monomer mixture, to which bis(2-ethylhexyl) peroxodicarbonate (EHP) or tertbuyl peroxopivalate (TBP), dissolved in white spirits (0.5% by weight of EHP or TBP in the solvent) has been added as an initiator, is fed into the reactor under reaction pressure. The residence time of the reactants in the autoclave is about 80 seconds. The polymerization conditions are summarized in the Table 1 and the properties of the terpolymers obtained are summarized in Table 1a.

The vinyl acetate content and the content of the neononanoic acid or neodecanoic acid is determined by pyrolysis of the polymer. For this, the terpolymer is subjected to cleavage by heat at 450° C. in a closed system in vacuo. The pyrolyzate and residue are dissolved in toluene. The acetic acid, as a cleavage product, is separated from the neononanoic acid or the neodecanoic acid, which remains in the toluene phase, by extracting several times by shaking with hot water. After addition of 2-propanol, the combined aqueous phases and the toluene phase are titrated potentiometrically to the equivalence point with a solution of KOH in ethanol (0.1 mol of KOH per liter of solution). The KOH consumption for the aqueous phase corresponds to the vinyl acetate content and the KOH consumption for the toluene phase corresponds to the vinyl neononanoate or neodecanoate content. If appropriate, a blank value must be determined for the solvent in the same way and taken into account in the calculation.

TABLE 1

| | | | Preparation of the terpolymers | | | | |
|---|---|---|---|---|---|---|---|
| | | | Composition of the reaction mixture | | | | |
| Ex. No. | Reaction pressure (MPa) | Reaction temp. (°C.) | $C_2H_4$ | Vinyl acetate | Vinyl neononanoate (neodecanoate) | Initiator (ppm by wt. based on the ethylene) | Moderator (% by wt., based on the monomers) | Yield (%, based on the amount employed) |
| | | | (% by wt., based on the reaction mixture) | | | | | |
| 1 | 150 | 230 | 63.8 | 9.6 | 24.7 | 40 | 1.9 | 19.4 |

TABLE 1-continued

Preparation of the terpolymers
Composition of the reaction mixture

| Ex. No. | Reaction pressure (MPa) | Reaction temp. (°C.) | C₂H₄ | Vinyl acetate | Vinyl neononanoate (neodecanoate) | Initiator (ppm by wt. based on the ethylene) | Moderator (% by wt., based on the monomers) | Yield (%, based on the amount employed) |
|---|---|---|---|---|---|---|---|---|
| | | | (% by wt., based on the reaction mixture) | | | | | |
| 2 | 150 | 230 | 73.0 | 14.6 | 10.0 | 55 | 2.4 | 16.9 |
| 3 | 150 | 230 | 63.1 | 15.0 | 19.7 | 140 | 2.1 | 19.7 |
| 4 | 150 | 230 | 68.0 | 19.6 | 10.2 | 75 | 2.2 | 18.1 |
| 5 | 150 | 230 | 63.2 | 19.8 | 15.0 | 75 | 2.1 | 20.0 |
| 6 | 150 | 230 | 68.4 | 24.8 | 4.5 | 300 | 2.2 | 18.4 |
| 7 | 150 | 230 | 63.7 | 24.7 | 9.6 | 350 | 2.1 | 19.1 |
| 8 | 150 | 230 | 59.0 | 24.3 | 14.8 | 400 | 1.9 | 19.3 |
| 9 | 150 | 230 | 63.5 | 29.4 | 4.8 | 300 | 2.3 | 19.8 |
| 10 | 150 | 230 | 58.9 | 29.4 | 9.6 | 350 | 2.1 | 20.6 |
| 11 | 150 | 230 | 53.7 | 29.6 | 14.8 | 400 | 2.0 | 20.8 |
| 12 | 200 | 160 | 66.1 | 24.0 | 4.1 | 190 | 5.9 | 9.2 |
| 13 | 200 | 160 | 61.5 | 23.8 | 9.2 | 225 | 5.5 | 10.3 |
| 14 | 200 | 160 | 57.0 | 23.5 | 14.3 | 265 | 5.2 | 11.4 |
| 15 | 200 | 160 | 61.1 | 28.3 | 4.6 | 225 | 6.0 | 9.8 |
| 16 | 200 | 160 | 56.4 | 28.2 | 9.2 | 265 | 6.3 | 11.5 |
| 17 | 160 | 230 | 61.9 | 31.7 | 4.5 | 300 | 1.9 | 20.1 |
| 18 | 160 | 230 | 59.6 | 30.4 | 7.9 | 350 | 2.1 | 20.7 |

TABLE 1a

Properties of the terpolymers
Characterization of the polymers

| Example No. | Vinyl acetate (% by wt.) | Vinyl neononanoate (neodecanoate) (% by wt.) | Viscosity at 140° C. (mPa.s) | $M_n$ (g/mol) |
|---|---|---|---|---|
| 1 | 9.1 | 23.5 | 260 | 1812 |
| 2 | 12.5 | 9.7 | 240 | 1890 |
| 3 | 13.3 | 18.3 | 260 | 1789 |
| 4 | 19.4 | 9.5 | 270 | 1910 |
| 5 | 18.0 | 13.5 | 250 | 1877 |
| 6 | 23.6 | 4.6 | 240 | 1821 |
| 7 | 22.6 | 9.3 | 290 | 1971 |
| 8 | 21.7 | 13.5 | 270 | 1850 |
| 9 | 26.0 | 5.0 | 240 | 1767 |
| 10 | 25.9 | 9.7 | 270 | 1829 |
| 11 | 24.9 | 13.9 | 270 | 1948 |
| 12 | 23.3 | 5.5 | 45 | 1164 |
| 13 | 24.2 | 8.9 | 50 | 1195 |
| 14 | 23.7 | 13.6 | 55 | 1283 |
| 15 | 26.8 | 4.8 | 50 | 1274 |
| 16 | 24.9 | 9.1 | 45 | 998 |
| 17 | 28.1 | 3.8 | 200 | 1543 |
| 18 | 27.6 | 5.9 | 210 | 1615 |

Effectiveness of the terpolymers

The effectiveness of the terpolymers of Examples 1 to 18 as additives for mineral oils and mineral oil distillates is characterized by the CFPP (cold filter plugging point) test in Table 2. The effectiveness of a commercially available ethylene/vinyl acetate copolymer (EVA, with a vinyl acetate content of 28.7% by weight) and a likewise commercially available ethylene/vinyl acetate/diisobutylene terpolymer (EVA-DIB; 27.1% by weight vinyl acetate and 6% by weight diisobutylene) is shown for comparison. The melt viscosity (at 140° C.) of the polymers is 275 and 320 mPa.s, respectively, and their average molecular masses are 1790 and 1920 g/mol, respectively. The test is carried out in accordance with DIN 51428; the test procedure is also published in J. of the Inst. of Petr., Vol. 52, June 1966, pages 173 to 185.

Seven middle distillates A to G, to which the polymers are added as a 50% by weight dispersion in kerosene, are employed for the test. The middle distillates A to G are characterized by the following properties:

Characteristics of the middle distillates

| Middle distillate | Fractional analysis ASTM D 86 (°C.) | | | | CFPP blank value (°C.) |
|---|---|---|---|---|---|
| | Start of boiling | 20 % by volume | 90 | End of boiling | |
| A | 184 | 213 | 341 | 363 | −5 |
| B | 160 | 245 | 358 | 383 | −3 |
| C | 160 | 200 | 313 | 343 | −13 |
| D | 160 | 210 | 318 | 353 | −14 |
| E | 160 | 229 | 333 | 366 | −5 |
| F | 210 | 255 | 356 | 375 | 0 |
| G | 181 | 219 | 345 | 374 | −6 |

The results of Examples 1 to 18 show that the terpolymers according to the invention have a significantly improved effectiveness when used in middle distillate fractions compared to the customary ethylene/vinyl acetate copolymers.

TABLE 2

Effectiveness of the terpolymers (CFPP test)

| Polymer from Ex. No. | CFPP (°C.) in the middle distillate | | | | | | |
|---|---|---|---|---|---|---|---|
| | A | B | C | D | E | F | G |
| Amount of additive (ppm) | 400 | 100 | 500 | 300 | 100 | 300 | 250 |
| 1 | −18 | −13 | −19 | −14 | −12 | — | — |
| 2 | −15 | −16 | −19 | −14 | −13 | — | — |
| 3 | −19 | −13 | −18 | −17 | −12 | — | — |
| 4 | −20 | — | — | — | — | — | — |
| 5 | −19 | −14 | −18 | −19 | −13 | — | — |
| 6 | −19 | −15 | −18 | −18 | −16 | — | — |
| 7 | −20 | — | — | — | — | — | — |
| 8 | −19 | −14 | −20 | −20 | −14 | — | — |
| 9 | −19 | −9 | −18 | −19 | −16 | −8 | −16 |
| 10 | −16 | −5 | −18 | −18 | −9 | −10 | −17 |
| 11 | −17 | −4 | −19 | −17 | −14 | −7 | −16 |
| 12 | −18 | −16 | −22 | −20 | −16 | — | — |
| 13 | −20 | — | — | — | — | — | — |
| 14 | −18 | −6 | −19 | −25 | −9 | — | — |
| 15 | −19 | −11 | −22 | −23 | −15 | — | — |
| 16 | −18 | −5 | −26 | −23 | −9 | — | — |
| 17 | −20 | — | — | — | — | −7 | −16 |
| 18 | −18 | — | — | — | — | −9 | −16 |
| EVA | −18 | −7 | −17 | −18 | −13 | −6 | −14 |
| EVA-DIB | −17 | −12 | −20 | −23 | −8 | −8 | −14 |

Solubility of the terpolymers

The solubility properties of the novel polymers are summarized in Table 3. The determination is carried out as follows: 400 ppm of a dispersion of the polymer in kerosene (50% by weight of polymer, based on the dispersion) are stirred into the test oil at 20° C. for 2 minutes, the test oil being characterized by the following:

| Fractional analysis (according to ASTM D 86; °C.) | |
| --- | --- |
| Start of boiling | 186 |
| 20% by volume | 256 |
| 90% by volume | 350 |
| End of boiling | 372 |
| Cloud point (°C.) | +3 |
| CFPP (°C.) | −2 |
| Pour point (°C.) | −9 |

A test volume of 50 ml is then filtered under 30 kPa (300 mbar) over a Whatman PTFE filter (diameter 12 mm, pore width: 3 μm) and the filtration time is determined. At filtration times of >900 seconds, the filtrate volume is stated.

TABLE 3
Solubility of the terpolymers

| | Filtration time for 50 ml of test oil at 20° C. (s) |
| --- | --- |
| Blank value (measured without additive) | 203 |
| Polymer (400 ppm) from Example | |
| 8 | 720 |
| 9 | 253 |
| 10 | 221 |
| 11 | 216 |
| 12 | >900 (blocked after 13 ml) |
| 13 | >900 (blocked after 18 ml) |
| 14 | 259 |
| 15 | >900 (blocked after 16 ml) |
| 16 | 501 |
| 17 | 400 |
| 18 | 391 |
| EVA | >900 (blocked after 18 ml) |
| EVA-DIB | >900 (blocked after 20 ml) |

The solubility of the novel polymers is significantly improved compared with commercially available products.

Ease of Handling of the terpolymers

Their pour point, measured in a polymer/kerosene dispersion (50% by weight of polymer, based on the dispersion) in accordance with ISO 3016, is used as a measure of the ease of handling of the novel polymers.

TABLE 4
Ease of handling of the terpolymers

| Polymer from Example | Pour point in accordance with ISO 3016 50% in kerosene |
| --- | --- |
| 1 | +24 |
| 2 | +27 |
| 3 | +12 |
| 4 | +24 |
| 5 | +12 |
| 6 | +15 |
| 7 | +15 |
| 8 | +6 |
| 9 | +3 |
| 10 | −3 |
| 11 | −12 |
| 12 | +18 |
| 13 | +9 |
| 14 | −9 |
| 15 | +12 |
| 16 | +6 |
| 17 | +3 |
| 18 | ±0 |
| EVA | +18 |
| EVA-DIB | +12 |

As can be seen, the polymers have very good flow properties.

What we claim is:

1. A terpolymer comprising ethylene units, 5% to 35% by weight of vinyl acetate units, and 1% to 25% by weight of vinyl neononanoate or vinyl neodecanoate units, both based on said terpolymer, said terpolymer having a number average molecular mass ($\overline{M}_n$) of 500 to 5,000 g/mol.

2. The terpolymer of claim 1 wherein said molecular mass is 1,000 to 3,000 g/mol.

3. The terpolymer of claim 1 having a melt viscosity at 140° C. of 20 to 1,000 MPa.s.

4. The terpolymer of claim 3 wherein said melt viscosity is 40 to 300 MPa.s.

* * * * *